United States Patent
He et al.

(10) Patent No.: US 12,544,692 B2
(45) Date of Patent: Feb. 10, 2026

(54) STRUCTURE FOR ASSEMBLING AND DISASSEMBLING DIRT SUCTION HEAD TO/FROM FILTER BAG

(71) Applicant: NINGBO DONGCHUAN SWIMMING POOL EQUIPMENT CO., LTD., Ningbo (CN)

(72) Inventors: Huaizhong He, Ningbo (CN); Hu Zhang, Ningbo (CN)

(73) Assignee: NINGBO DONGCHUAN SWIMMING POOL EQUIPMENT CO., LTD., Ningbo (CN)

( * ) Notice: Subject to any disclaimer, the term of this patent is extended or adjusted under 35 U.S.C. 154(b) by 1080 days.

(21) Appl. No.: 17/562,005

(22) Filed: Dec. 27, 2021

(65) Prior Publication Data

US 2022/0203271 A1   Jun. 30, 2022

(30) Foreign Application Priority Data

Dec. 31, 2020   (CN) .......................... 202023335655.4

(51) Int. Cl.
| | | |
|---|---|---|
| *F16B 7/04* | (2006.01) | |
| *B01D 29/27* | (2006.01) | |
| *E04H 4/16* | (2006.01) | |

(52) U.S. Cl.
CPC ............ *B01D 29/27* (2013.01); *F16B 7/0406* (2013.01); *B01D 2201/4053* (2013.01); *E04H 4/1636* (2013.01)

(58) Field of Classification Search
CPC ........ F16B 7/0406; F16B 7/0426; F16B 7/20; F16B 7/22; F16B 21/02; F16B 21/04; F16B 2200/20; F16B 2200/50; Y10T 403/64; Y10T 403/7005; Y10T 403/7007; E04H 4/1254; E04H 4/1263; E04H 4/1636; E04H 4/169; A47L 9/1427; A47L 9/1436; A47L 9/242; A47L 9/248
USPC ............................. 403/335, 348, 349; 15/1.7
See application file for complete search history.

(56) References Cited

U.S. PATENT DOCUMENTS

| | | | | |
|---|---|---|---|---|
| 303,474 | A * | 8/1884 | Webb ......................... | F16B 7/20 |
| | | | | 43/18.1 R |
| 2,561,279 | A * | 7/1951 | Holt ..................... | A47L 11/4069 |
| | | | | 15/49.1 |
| 4,878,695 | A * | 11/1989 | Whitham .............. | F16L 37/252 |
| | | | | 403/348 |

(Continued)

*Primary Examiner* — Amber R Anderson
*Assistant Examiner* — Zachary A Hall
(74) *Attorney, Agent, or Firm* — Getech Law LLC; Jun Ye (57) ABSTRACT

The present invention provides a structure for assembling and disassembling a dirt suction head to/from a filter bag, comprising a first connection piece and a second connection piece; one end of the second connection piece is detachably connected to a connection pipe of the dirt suction head, and the other end of the second connection piece is provided with a holding cavity; one end of the first connection piece is connected to an opening of an end of a filter bag body, and the other end of the first connection piece is assembled into the holding cavity; or a circumferential side edge of the opening of the filter bag body is tightly pressed and fixed between an outer side wall of the first connection piece and an inner side wall of the holding cavity, which has achieved a quick assembling and disassembling and smooth external aesthetics of a connection position.

12 Claims, 6 Drawing Sheets

(56) References Cited

U.S. PATENT DOCUMENTS

| | | | | |
|---|---|---|---|---|
| 4,941,783 A | * | 7/1990 | Maier | E21B 17/046 |
| | | | | 279/93 |
| 5,269,913 A | * | 12/1993 | Atkins | B01D 35/147 |
| | | | | 210/136 |
| 5,294,236 A | * | 3/1994 | Baird | A47L 9/19 |
| | | | | 55/374 |
| 6,126,359 A | * | 10/2000 | Dittrich | B25G 3/04 |
| | | | | 403/325 |
| 6,447,197 B1 | * | 9/2002 | Hiura | B60R 16/027 |
| | | | | 403/14 |
| 7,530,607 B2 | * | 5/2009 | Luft | F16B 21/04 |
| | | | | 285/402 |
| 7,587,872 B2 | * | 9/2009 | Kodi | E04C 5/206 |
| | | | | 52/126.6 |
| 8,353,496 B2 | * | 1/2013 | Schwartz | A47G 33/004 |
| | | | | 248/346.03 |
| 8,602,597 B2 | * | 12/2013 | Lopez | F21V 29/85 |
| | | | | 362/651 |
| 8,986,127 B2 | * | 3/2015 | Berthalon | F16D 3/72 |
| | | | | 464/80 |
| 9,523,997 B2 | * | 12/2016 | Tsugawa | H01H 13/10 |

\* cited by examiner

STRUCTURE FOR ASSEMBLING AND DISASSEMBLING DIRT SUCTION HEAD TO/FROM FILTER BAG

CROSS REFERENCE TO THE RELATED APPLICATIONS

This application is based upon and claims priority to Chinese Patent Application No. 202023335655.4, filed on Dec. 31, 2020, the entire contents of which are incorporated herein by reference.

TECHNICAL FIELD

The present invention relates to the field of cleaning appliance technologies, and in particular to a structure for assembling and disassembling a dirt suction head to/from a filter bag.

BACKGROUND

A dirt suction device of a swimming pool is a tool used for cleaning dirt at the bottom of the swimming pool or a water pool, or the like. The existing dirt suction device for a swimming pool generally operates based on Venturi principle to clean the bottom of the swimming pool without discharging the swimming pool. A structure of the dirt suction device comprises a dirt suction device body, a connection pipe and a filter bag. Specifically, the dirt suction device body conveys, by suction, the garbage at the bottom of the pool through a corresponding connection pipe, and then collects it into the filter bag. After the pool is cleaned, the garbage in the filter bag is removed.

In the structure of the existing dirt suction device, the filter bag and the connection pipe are not connected conveniently, and a connection position is often directly exposed to the outside, resulting in poor aesthetics of the external appearance of the entire connection portion after the connection.

SUMMARY

To solve the technical problems and overcome the defects in the prior art, the present invention provides a structure for assembling and disassembling a dirt suction head to/from a filter bag to realize rapid assembly and disassembly of the filter bag and a connection pipe of the dirt suction head and achieve smooth external aesthetics of a connection position after assembly.

A technical solution adopted by the present invention is to provide a structure for assembling and disassembling a dirt suction head to/from a filter bag. The structure comprises a first connection piece and a second connection piece; one end of the second connection piece is detachably connected to a connection pipe of the dirt suction head, and the other end of the second connection piece is provided with a holding cavity; one end of the first connection piece is connected to an opening of an end of a filter bag body, and the other end of the first connection piece is assembled into the holding cavity; or, a circumferential side edge of the opening of the filter bag body is tightly pressed and fixed between an outer side wall of the first connection piece and an inner side wall of the holding cavity.

Compared to the prior art, the present invention has the following advantages.

In the structure of the present invention, the connection between the filter bag body and the connection pipe is realized through two connection pieces, and the filter bag body is fixed in an inner cavity of the second connection piece through the first connection piece to ensure no specific connection portion can be seen from the outside, thereby realizing the beautiful appearance of the product; further, the second connection piece is detachably connected to the connection pipe, so that assembly and disassembly can be carried out more conveniently and more rapidly.

Further, a limiting insertion hole is disposed at the bottom of the holding cavity, and a limiting insertion buckle correspondingly matched with the limiting insertion hole is disposed at an end of the first connection piece.

In an improvement, first limiting projections distributed along a circumferential direction is are disposed on the inner side wall of the holding cavity, and first limiting grooves matched with the first limiting projections are disposed on the outer side wall of the first connection piece.

Preferably, the first limiting projection is an elongated projection extending along an axial direction. In this structure, the limiting projection is designed into an elongated structure in such a way that an anti-rotation effect of the first connection piece and the second connection piece can be achieved and a guiding effect can also be provided during axial assembly.

In a further improvement, a fitting buckle is disposed at an end of the second connection piece away from the first connection piece, and a fitting slot matched with the fitting buckle is disposed at an end of the connection pipe. In this structure, the filter bag body is fixedly connected to the connection pipe through a corresponding connection assembly in a buckling manner. Therefore, the assembly and disassembly are more convenient, the connection structure is simpler, and production costs are reduced.

In a further improvement, the fitting buckle is an insertion column, and a positioning fitting slot is disposed on a side wall of the insertion column; an annular mounting plate is disposed at an end of the connection pipe, and an avoiding hole for the insertion column to penetrate through is disposed on the mounting plate. After being inserted into the avoiding hole along an axial direction, the insertion column is rotated by a preset angle along an opening direction of the positioning fitting slot to enable the positioning fitting slot to be cooperated with a side wall of the avoiding hole, thereby realizing fixed connection between the second connection piece and the connection pipe. In this improved structure, the second connection piece and the connection pipe are not simply inserted together along an axial direction but form a fitting mechanism through cooperation of the positioning fitting slot and the side wall of the avoiding hole after the circumferential rotation of a certain angle is performed. With such a structural disposal, no resistance will be encountered during axial assembly, so as to facilitate insertion. Further, a new fitting part will be formed after rotation of this angle, and an axial connection strength will be more stable after connection; during disassembly, the second connection piece is rotated reversely until the insertion column corresponds to the avoiding hole, and then the second connection piece may be axially pulled out to realize disassembly.

In a further improvement, a second limiting groove is disposed at a side of the insertion column opposed to an axis of the second connection piece, and a second limiting projection matched with the second limiting groove is disposed at a position that is on the side wall of the connection pipe and close to the avoiding hole. In this improved structure, the insertion column on the second connection piece and the mounting plate can provide stable circumferential limitation after being assembled, thus preventing circumferential rotation.

Numerals of the drawings are described as follows:

1—filter bag body, 2—first connection piece, 2.1—limiting insertion buckle, 2.2—first limiting groove, 3—second connection piece, 3.1—holding cavity, 3.2—limiting insertion hole, 3.3—first limiting projection, 3.4—insertion column, 3.4.1—positioning fitting slot, 3.4.2—second limiting groove, 4—conenction pipe, 4.1—second limiting projection, 5—mounting plate, and 5.1—avoiding hole.

DETAILED DESCRIPTIONS OF EMBODIMENTS

The present invention will be further described in detail below in combination with accompanying drawings and specific embodiments.

It is to be noted that, in the descriptions of the present invention, unless otherwise clearly stated or defined, the terms "connect" and "assemble" shall be understood in a broad sense, for example, may be fixed connection, or detachable connection, or formed into one piece; or may be mechanical connection, or electrical connection; or may be direct connection or indirect connection through an intermediate medium, or may be internal communication between two elements. Those of ordinary skill in the art may understand the specific meanings of the above terms in the present invention according to actual situations. In addition, the terms "first" and "second" are used only for convenience of distinguishing and understanding and do not have specified or defined meanings.

Embodiment 1

Figure 1:
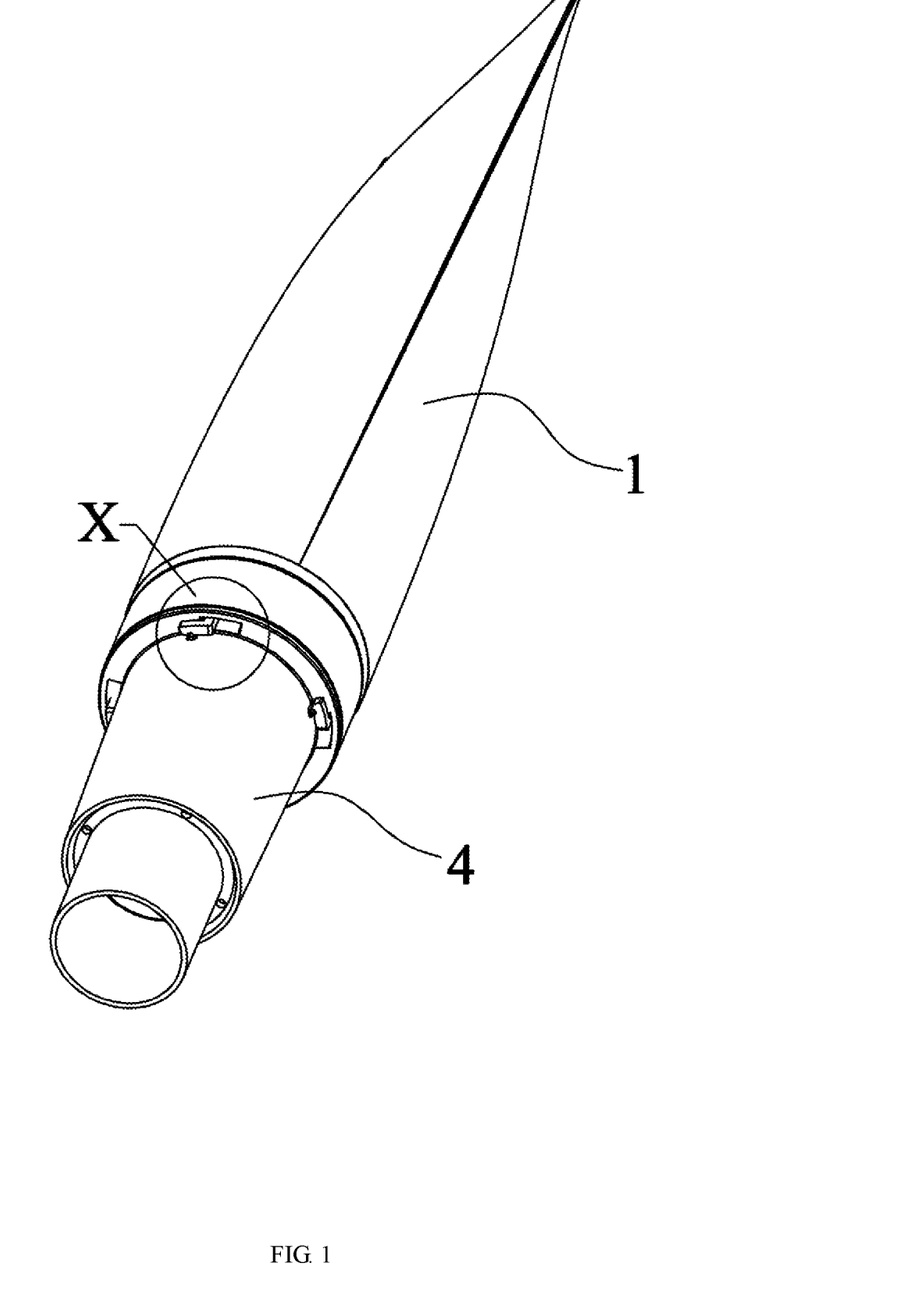
FIG. 1 is a schematic diagram of a structure for assembling and disassembling a dirt suction head to/from a filter bag, which is connected with a filter bag body and a connection pipe according to the present invention.
Figure 2:
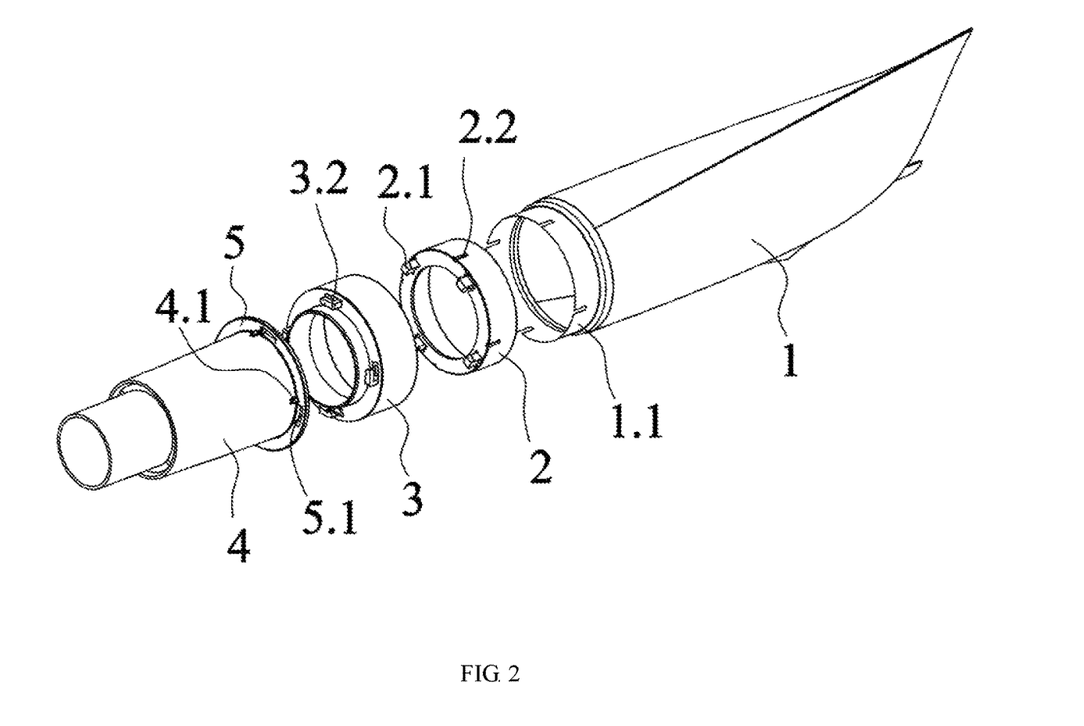
FIG. 2 is an exploded view of a structure for assembling and disassembling a dirt suction head to/from a filter bag, which is connected with a filter bag body and a connection pipe according to the present invention.

As shown in FIG. 1 and FIG. 2, the present invention provides a structure for assembling and disassembling a dirt suction head to/from a filter bag. The structure comprises a first connection piece 2 and a second connection piece 3; one end of the second connection piece 3 is detachably connected to a connection pipe 4 of the dirt suction head, and the other end of the second connection piece 3 is provided with a holding cavity 3.1; one end of the first connection piece 2 is connected to an opening of an end of a filter bag body 1, and the other end of the first connection piece 2 is assembled into the holding cavity 3.1. Specifically, an openable window may also be disposed on a side wall of the filter bag to facilitate emptying garbage in the filter bag.

Figure 4:
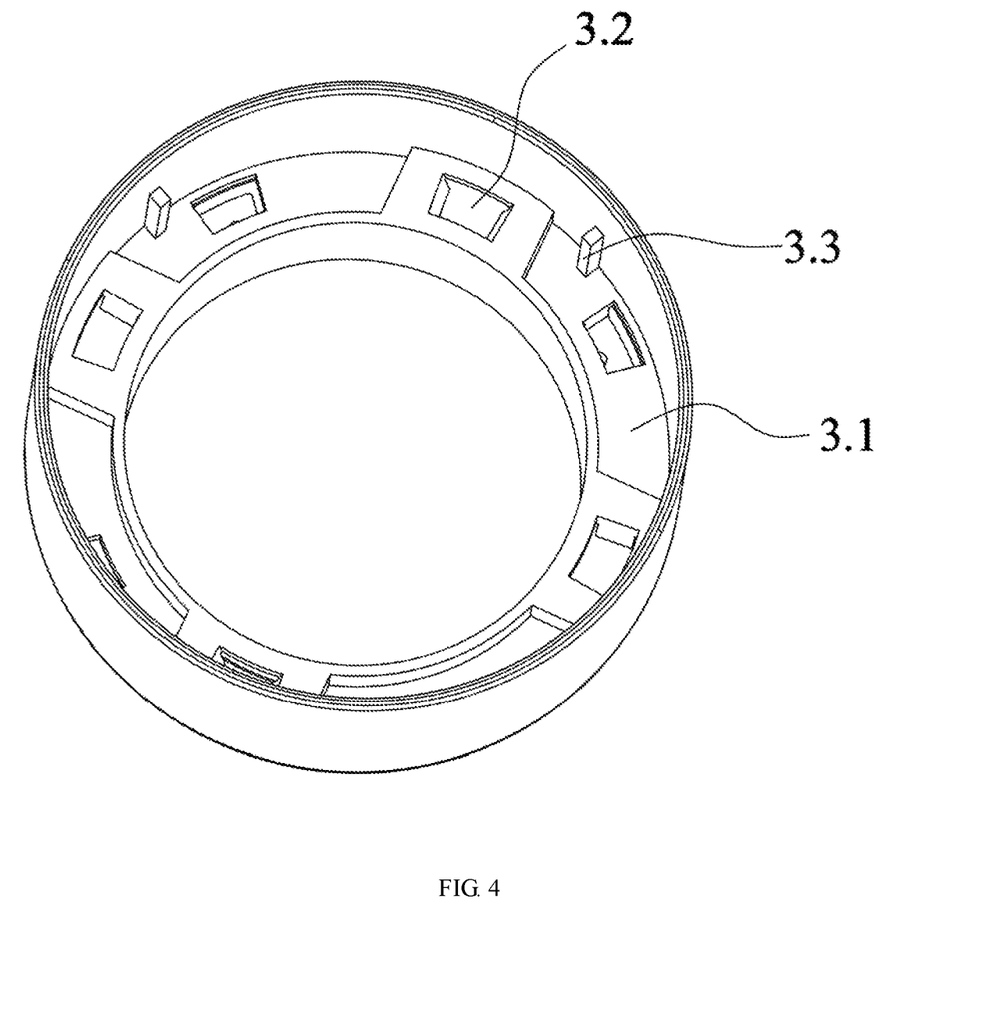
FIG. 4 is a structural schematic diagram illustrating the second connection piece at another angle according to the present invention.
Figure 5:
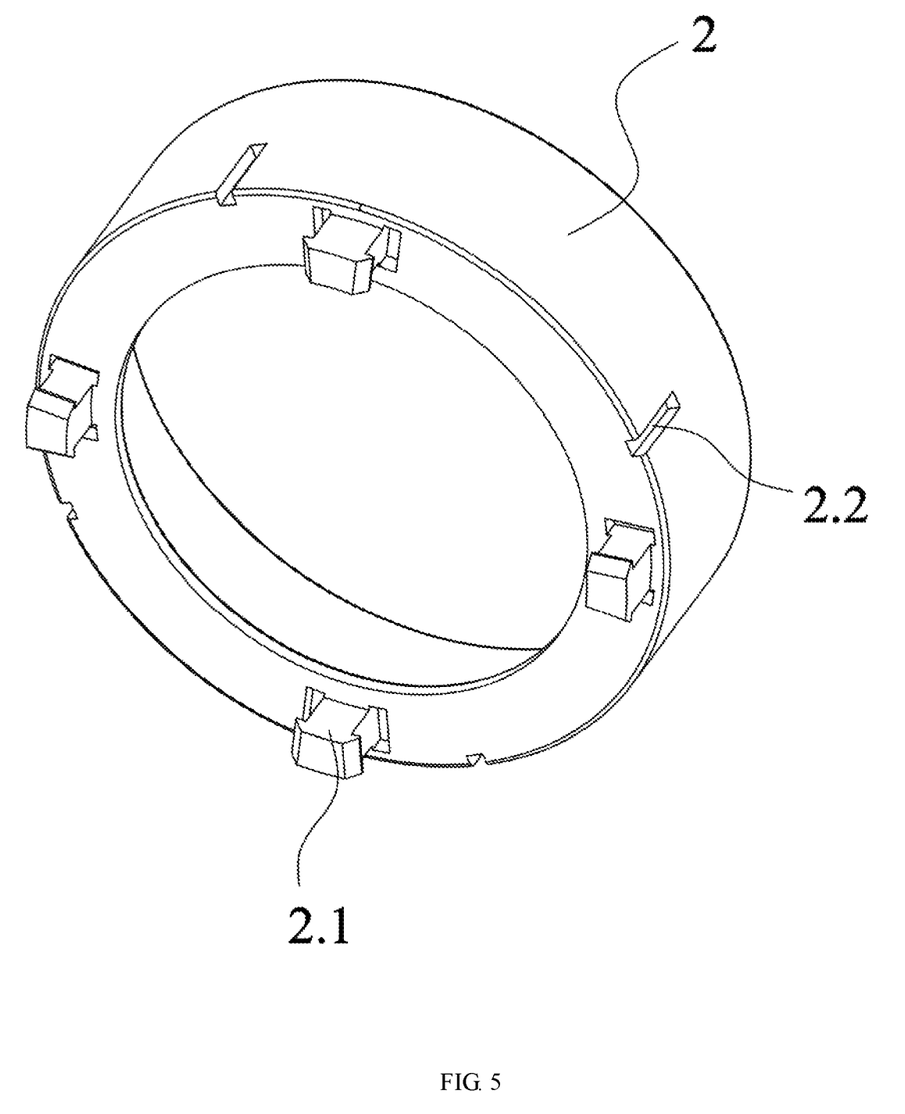
FIG. 5 is a structural schematic diagram illustrating a first connection piece according to the present invention.

Specifically, as shown in FIG. 4 and FIG. 5, to increase a connection strength of the first connection piece 2 and the second connection piece 3, a limiting insertion hole 3.2 is disposed at a bottom of the holding cavity 3.1. Correspondingly, a limiting insertion buckle 2.1 correspondingly matched with the limiting insertion hole 3.2 is disposed at an end of the first connection piece 2. In this embodiment, four limiting insertion holes 3.2 are circumferentially and uniformly disposed at the bottom of the holding cavity 3.1. Correspondingly, four limiting insertion buckles are also disposed at an end of the first connection piece 1. This way, stable cooperative connection between the first connection piece 2 and the second connection piece 3 can be guaranteed. Certainly, in other embodiments, another number of limiting insertion holes 3.2 may be disposed; in a practical application, at least two symmetrical limiting insertion holes may be disposed.

In this embodiment, the connection between the opening of the end of the filter bag body 1 and the first connection piece 2 refers to that a side wall of the opening end of the filter bag body 1 and an end of the first connection piece 2 are directly seamed together, or may be bonded together by glue, or the first connection piece 2 may be directly injection-molded on the side wall of the opening end of the filter bag body 1. More specifically, in this structure, the second connection piece 2 is made into an annular structure in such a way that the opening end of the filter bag body 1 can be guaranteed to be in communication after connection and, an inner cavity of the filter bag body 1 and an inner cavity of the connection pipe 4 are finally communicated with each other; thus, the connection pipe 4 of the dirt suction head may suck and collect the garbage into the filter bag body 1. Further, in this structure, the side wall of the opening end of the filter bag body 1 may be connected to an inner side wall of the first connection piece 2, or may be fixedly connected to an outer side wall of the first connection piece 2. In this connection manner, due to presence of the second connection piece 3, a connection portion between the opening of the filter bag body 1 and the first connection piece 2 is hidden in the holding cavity 3.1, such that the external appearance of the entire connection structure looks smoother and more beautiful.

In this structure, for more convenient connection, as shown in FIG. 2, a connection portion 1.1 may also be pre-connected at the opening of an end of the filter bag body 1, so that the connection portion 1.1 and the first connection piece 2 can be more conveniently seamed, or glued together or directly injection-molded.

In another aspect, as shown in FIG. 4, first limiting projections 3.3 distributed in a circumferential direction are disposed on the inner side wall of the holding cavity 3.1, and first limiting grooves 2.2 matched with the first limiting projections 3.3 are disposed on the outer side wall of the first connection piece 2. In this structure, the first limiting projections 3.3 are correspondingly disposed to enable more stable cooperation between the first connection piece 2 and the second connection piece 3, thereby preventing circumferential rotation and ensuring use effect. Similarly, in this structure, four uniformly-distributed first limiting projections 3.3 are circumferentially disposed on the inner side wall of the holding cavity 3.1, thereby ensuring limiting stability. In other embodiments, another number of first limiting projections 3.3 may be disposed, which will not be described in detail.

In this embodiment, the first limiting projection 3.3 preferably is an elongated projection extending along an axial direction. The elongated structure of the first limiting projection 3.3 can not only prevent circumferential rotation but also provide a guiding effect for the first connection piece 2 be to axially assembled into the holding cavity 3.1, so that the limiting insertion buckles 2.1 at the end of the first connection piece 2 can be accurately matched with the limiting insertion holes 3.2 after the first connection piece 2 is assembled in the holding cavity 3.1, thereby facilitating fitting and assembly.

Figure 3:
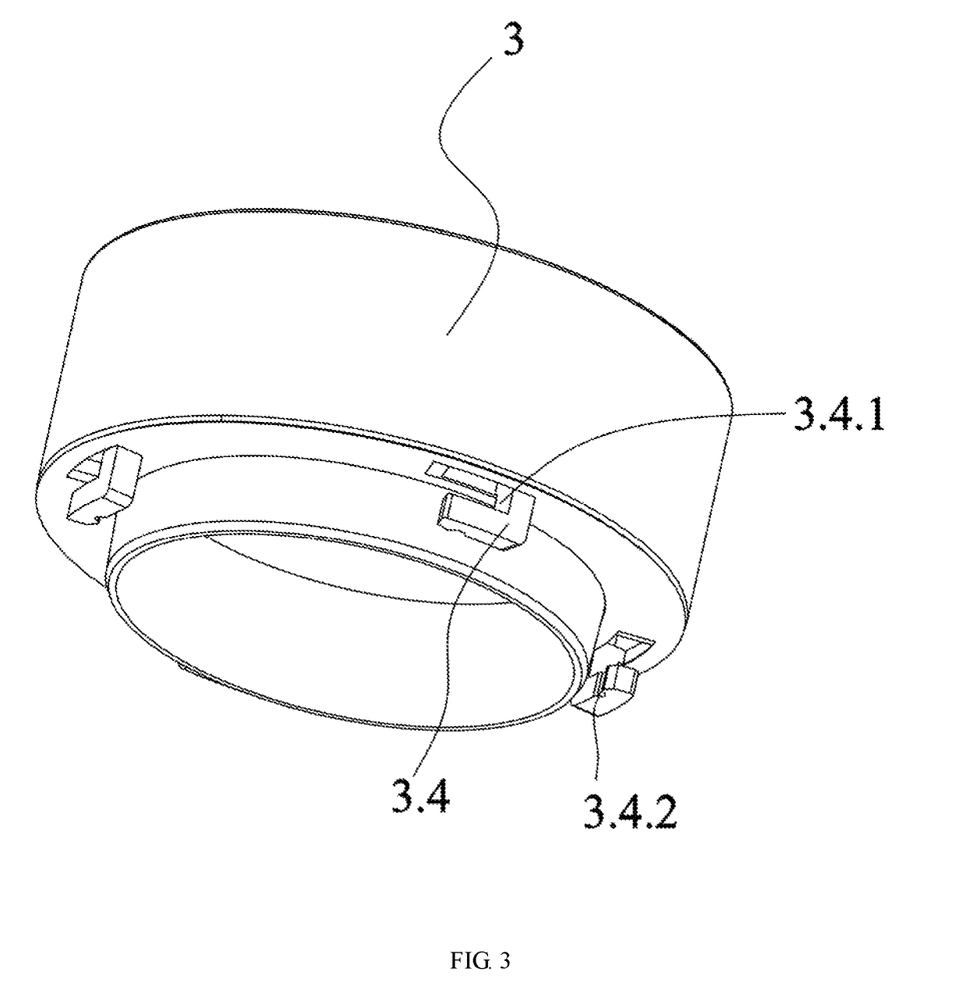
FIG. 3 is a structural schematic diagram illustrating a second connection piece according to the present invention.

In addition, in this structure, to facilitate rapid and detachable connection between the second connection piece 3 and the connection pipe 4, a fitting buckle structure is disposed at an end of the second connection piece 3 away from the first connection piece 2, and a fitting slot structure matched with the fitting buckle is disposed at an end of the connection pipe 4. In this way, the second connection piece 3 and the connection pipe 4 may be directly fitted together along an axial direction during assembly, realizing convenient and rapid assembly. Specifically, in this embodiment, there are preferably four fitting buckles and four fitting slots which are circumferentially and uniformly disposed to ensure connection stability. Similarly, in other embodiments, another number of fitting buckles may be disposed, and even two symmetrical fitting buckles may be sufficient to realize fitting assembly in an extreme situation.

In this embodiment, preferably, as shown in FIG. 3, the fitting buckle is an insertion column 3.4, and a positioning fitting slot 3.4.1 is disposed on a side wall of the insertion column 3.4; an annular mounting plate 5 is disposed at an end of the connection pipe 4, and an avoiding hole 5.1 for the insertion column 3.4 to penetrate through is disposed on the mounting plate 5. During assembly, the insertion column 3.4 is rotated by a preset angle along a circumferential direction after being inserted into the avoiding hole 5.1 along an axial direction, such that the positioning fitting slot 3.4.1 is cooperated with the side wall of the avoiding hole 5.1.

Figure 6:
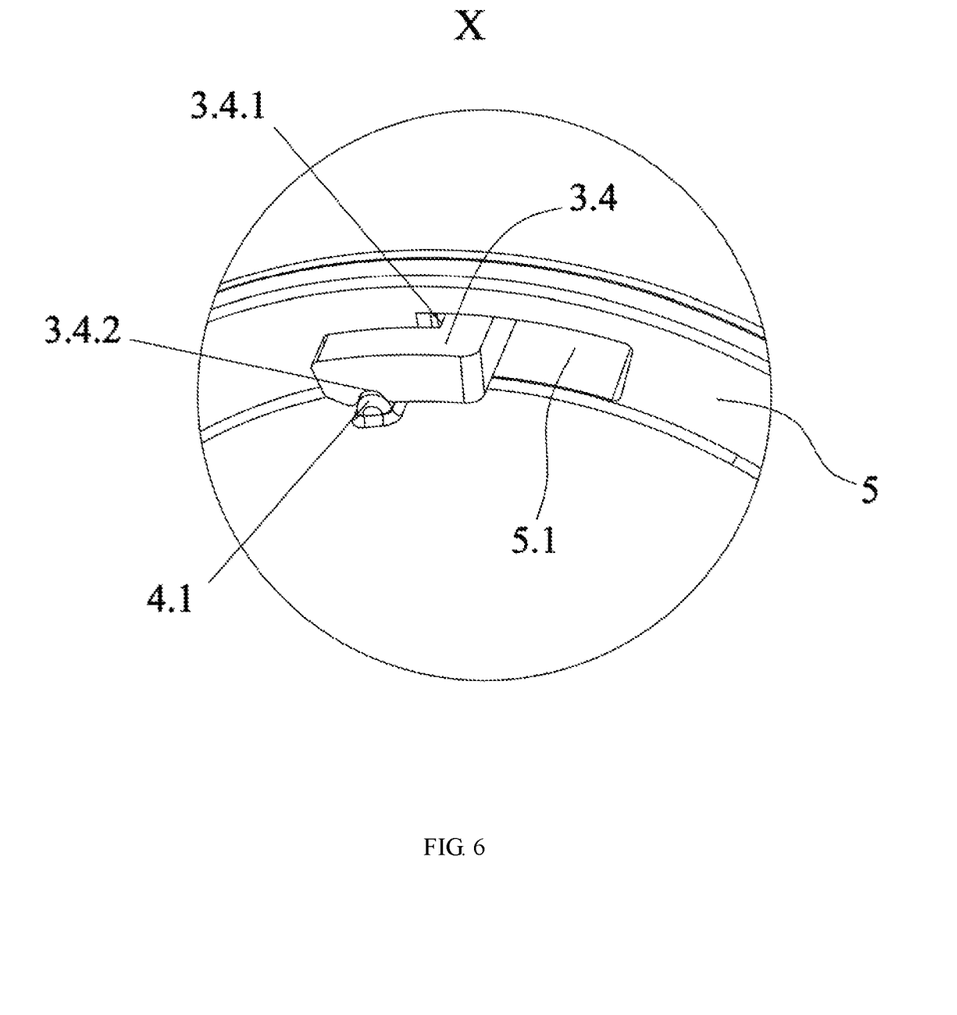
FIG. 6 is an enlarged view of the position X in FIG. 1.

In a further improvement, in this structure, a second limiting groove 3.4.2 is disposed at a side of the insertion column 3.4 opposed to an axis of the second connection piece 3, and a second limiting projection 4.1 matched with the second limiting groove 3.4.2 is disposed at a position that is on the side wall of the connection pipe 4 and close to the avoiding hole 5.1. With this disposal, during assembly, the insertion column 3.4 on the second connection piece 3 is firstly penetrated through the avoiding hole 5.1 on the mounting plate 5 along an axial direction, and then rotated along an opening direction of the positioning fitting slot 3.4.1 until the positioning fitting slot 3.4.1 is fitted on the side wall of a side of the avoiding hole 5.1. Further, after the insertion column 3.4 is rotated to be in place, the second limiting groove 3.4.2 on the insertion column 3.4 is exactly matched with the second limiting projection 4.1 on the side wall of an end of the connection pipe 4, thereby further ensuring connection stability therebetween, as shown in FIG. 6.

Embodiment 2

A structure of this embodiment is substantially same as that of the embodiment 1 except for a major difference that the connection portion 1.1 and the second connection piece 3 are connected in a different manner.

Specifically, in this embodiment, the connection portion 1.1 is tightly pressed and fixed between the outer side wall of the first connection piece 2 and the inner side wall of the holding cavity 3.1 to realize fixed connection between the filter bag body 1 and the second connection piece 3. In this process, the connection portion 1.1 on the filter bag body 1 does not need to be fixedly connected to the first connection piece 2. That is, when an end of the first connection piece 2 is assembled in the holding cavity 3.1, there is a small gap between the inner side wall of the holding cavity 3.1 and the outer side wall of the first connection piece 2, where a thickness of the gap is slightly smaller than that of the connection portion 1.1. In this case, during assembly, the first connection piece 2 is fitted at the inner side of the connection portion 1.1, and then, the first connection piece 2 and the connection portion 1.1 are both pressed into the holding cavity 3.1 along a circumferential direction, so that the side walls of the connection portion 1.1 are tightly pressed between the inner side wall of the holding cavity 3.1 and the outer side wall of the first connection piece 2, thereby realizing the fixed connection between the filter bag body 1 and the second connection piece 3. Pre-connection of the connection portion 1.1 and the first connection piece 2 is omitted in the above manner, resulting in more convenient and fast connection. Further, there is no other connection structure used for fixing the filter bag body 1 in such connection manner, thereby ensuring the beautiful appearance of the entire product after assembly is completed.

The foregoing descriptions are merely illustrative of the preferred embodiments of the present invention, and shall not be understood as limiting to the claims. The present invention is not limited to the above embodiments, and change of the specific structure thereof is allowed. Various changes made within the scope of protection of the independent claims of the present invention are all within the scope of protection of the present invention.

The invention claimed is:

1. A structure for assembling and disassembling a dirt suction head to/from a filter bag, comprising:
   a filter bag body;
   a first connection piece (2);
   a second connection piece (3); and
   a connection pipe (4), wherein one end of the second connection piece (3) is detachably connected to the connection pipe (4), and the other end of the second connection piece (3) is provided with a holding cavity (3.1);
   one end of the first connection piece (2) is assembled inside the holding cavity;
   a circumferential side edge of the opening of the filter bag body (1) is tightly pressed and fixed between an outer side wall of the first connection piece (2) and an inner side wall of the holding cavity (3.1),
   wherein
   a limiting insertion hole (3.2) is disposed at the bottom of the holding cavity (3.1),
   a limiting insertion buckle (2.1) correspondingly matched with the limiting insertion hole (3.2) is disposed at an end of the first connection piece (2),
   first limiting projections (3.3) distributed along a circumferential direction are disposed on the inner side wall of the holding cavity (3.1), and
   first limiting grooves (2.2) matched with the first limiting projections (3.3) are disposed on the outer side wall of the first connection piece (2).

2. The structure for assembling and disassembling a dirt suction head to/from a filter bag of claim 1, wherein the first limiting projection (3.3) is an elongated projection extending along an axial direction.

3. The structure for assembling and disassembling a dirt suction head to/from a filter bag of claim 2, wherein a fitting buckle is disposed at an end of the second connection piece (3) away from the first connection piece (2), and a fitting slot matched with the fitting buckle is disposed at an end of the connection pipe (4).

4. The structure for assembling and disassembling a dirt suction head to/from a filter bag of claim 3, wherein the fitting buckle is an insertion column (3.4), and a positioning fitting slot (3.4.1) is disposed on a side wall of the insertion column (3.4), an annular mounting plate (5) is disposed at an end of the connection pipe (4), and an avoiding hole (5.1) for the insertion column (3.4) to penetrate through is disposed on the mounting plate (5), and the insertion column (3.4) is rotatable by a preset angle along an opening direction of the positioning fitting slot (3.4.1) after inserting into the avoiding hole (5.1) along an axial direction, to enable the positioning fitting slot (3.4.1) to be cooperated with a side wall of the avoiding hole (5.1).

5. The structure for assembling and disassembling a dirt suction head to/from a filter bag of claim 4, wherein a second limiting groove (3.4.2) is disposed at a side of the insertion column (3.4) opposed to an axis of the second connection piece (3), and a second limiting projection (4.1) matched with the second limiting groove (3.4.2) is disposed at a position that is on the side wall of the connection pipe (4) and close to the avoiding hole (5.1).

6. The structure for assembling and disassembling a dirt suction head to/from a filter bag of claim 1, wherein a fitting buckle is disposed at an end of the second connection piece (3) away from the first connection piece (2), and a fitting slot matched with the fitting buckle is disposed at an end of the connection pipe (4).

7. The structure for assembling and disassembling a dirt suction head to/from a filter bag of claim 6, wherein the fitting buckle is an insertion column (3.4), and a positioning fitting slot (3.4.1) is disposed on a side wall of the insertion column (3.4), an annular mounting plate (5) is disposed at an end of the connection pipe (4), and an avoiding hole (5.1) for the insertion column (3.4) to penetrate through is disposed on the mounting plate (5);

the insertion column (3.4) is rotatable by a preset angle along an opening direction of the positioning fitting slot (3.4.1) after inserting into the avoiding hole (5.1) along an axial direction, to enable the positioning fitting slot (3.4.1) to be cooperated with a side wall of the avoiding hole (5.1).

8. The structure for assembling and disassembling a dirt suction head to/from a filter bag of claim 7, wherein a second limiting groove (3.4.2) is disposed at a side of the insertion column (3.4) opposed to an axis of the second connection piece (3), and a second limiting projection (4.1) matched with the second limiting groove (3.4.2) is disposed at a position that is on the side wall of the connection pipe (4) and close to the avoiding hole (5.1).

9. A structure for assembling and disassembling a dirt suction head to/from a filter bag, comprising:

a filter bag body;

a first connection piece (2);

a second connection piece (3); and a connection pipe (4), wherein one end of the second connection piece (3) is detachably connected to the connection pipe (4), and the other end of the second connection piece (3) is provided with a holding cavity (3.1);

one end of the first connection piece (2) is assembled inside the holding cavity;

a circumferential side edge of the opening of the filter bag body (1) is tightly pressed and fixed between an outer side wall of the first connection piece (2) and an inner side wall of the holding cavity (3.1), wherein a fitting buckle is disposed at an end of the second connection piece (3) away from the first connection piece (2), a fitting slot matched with the fitting buckle is disposed at an end of the connection pipe (4), the fitting buckle is an insertion column (3.4), and a positioning fitting slot (3.4.1) is disposed on a side wall of the insertion column (3.4), an annular mounting plate (5) is disposed at an end of the connection pipe (4), an avoiding hole (5.1) for the insertion column (3.4) to penetrate through is disposed on the mounting plate (5), and the insertion column (3.4) is rotatable by a preset angle along an opening direction of the positioning fitting slot (3.4.1) after insertion into the avoiding hole (5.1) along an axial direction, to enable the positioning fitting slot (3.4.1) to be cooperated with a side wall of the avoiding hole (5.1).

10. The structure for assembling and disassembling a dirt suction head to/from a filter bag of claim 9, wherein a second limiting groove (3.4.2) is disposed at a side of the insertion column (3.4) opposed to an axis of the second connection piece (3), and a second limiting projection (4.1) matched with the second limiting groove (3.4.2) is disposed at a position that is on the side wall of the connection pipe (4) and close to the avoiding hole (5.1).

11. A structure for assembling and disassembling a dirt suction head to/from a filter bag, comprising:

a filter bag body:

a first connection piece (2);

a second connection piece (3); and a connection pipe (4), wherein one end of the second connection piece (3) is detachably connected to the connection pipe (4), and the other end of the second connection piece (3) is provided with a holding cavity (3.1);

one end of the first connection piece (2) is assembled inside the holding cavity;

a circumferential side edge of the opening of the filter bag body (1) is tightly pressed and fixed between an outer side wall of the first connection piece (2) and an inner side wall of the holding cavity (3.1), a limiting insertion hole (3.2) is disposed at the bottom of the holding cavity (3.1), and a limiting insertion buckle (2.1) correspondingly matched with the limiting insertion hole (3.2) is disposed at an end of the first connection piece (2), wherein a fitting buckle is disposed at an end of the second connection piece (3) away from the first connection piece (2), and a fitting slot matched with the fitting buckle is disposed at an end of the connection pipe (4), the fitting buckle is an insertion column (3.4), a positioning fitting slot (3.4.1) is disposed on a side wall of the insertion column (3.4), an annular mounting plate (5) is disposed at an end of the connection pipe (4), an avoiding hole (5.1) for the insertion column (3.4) to penetrate through is disposed on the mounting plate (5), and the insertion column (3.4) is rotatable by a preset angle along an opening direction of the positioning fitting slot (3.4.1) after insertion into the avoiding hole (5.1) along an axial direction, to enable the positioning fitting slot (3.4.1) to be cooperated with a side wall of the avoiding hole (5.1).

12. The structure for assembling and disassembling a dirt suction head to/from a filter bag of claim 11, wherein a second limiting groove (3.4.2) is disposed at a side of the insertion column (3.4) opposed to an axis of the second connection piece (3), and a second limiting projection (4.1) matched with the second limiting groove (3.4.2) is disposed at a position that is on the side wall of the connection pipe (4) and close to the avoiding hole (5.1).

\* \* \* \* \*